(12) United States Patent
Kim et al.

(10) Patent No.: US 11,157,512 B2
(45) Date of Patent: Oct. 26, 2021

(54) METHOD AND SYSTEM FOR REPLICATING DATA TO HETEROGENEOUS DATABASE AND DETECTING SYNCHRONIZATION ERROR OF HETEROGENEOUS DATABASE THROUGH SQL PACKET ANALYSIS

(71) Applicant: Warevalley Co., Ltd., Seoul (KR)

(72) Inventors: In ho Kim, Goyang-si (KR); Yeong gu Kwon, Seoul (KR)

(73) Assignee: Warevalley Co., Ltd., Seoul (KR)

( * ) Notice: Subject to any disclaimer, the term of this patent is extended or adjusted under 35 U.S.C. 154(b) by 398 days.

(21) Appl. No.: 16/133,523

(22) Filed: Sep. 17, 2018

(65) Prior Publication Data

US 2019/0197174 A1    Jun. 27, 2019

(30) Foreign Application Priority Data

Dec. 22, 2017 (KR) .......... 10-2017-0178652

(51) Int. Cl.
| | |
|---|---|
| *G06F 16/27* | (2019.01) |
| *G06F 16/25* | (2019.01) |
| *G06F 16/28* | (2019.01) |
| *G06F 16/242* | (2019.01) |

(52) U.S. Cl.
CPC .......... *G06F 16/27* (2019.01); *G06F 16/2433* (2019.01); *G06F 16/258* (2019.01); *G06F 16/284* (2019.01)

(58) Field of Classification Search
CPC ............ G06F 11/1451; G06F 11/1453; G06F 2201/80; G06F 16/275; G06F 3/0617; G06F 16/289; G06F 9/465; G06F 11/1464
See application file for complete search history.

(56) References Cited

U.S. PATENT DOCUMENTS

| 8,387,076 B2 * | 2/2013 | Thatte ..................... G06F 9/541 719/328 |
| 9,454,281 B2 * | 9/2016 | Ward ..................... G06F 3/0481 |
| 2007/0061487 A1 * | 3/2007 | Moore ..................... G06F 16/27 709/246 |
| 2010/0030730 A1 | 2/2010 | Shang et al. |
| 2016/0077926 A1 * | 3/2016 | Mutalik ............. G06F 11/1453 711/162 |

FOREIGN PATENT DOCUMENTS

| JP | 2017-027349 A | 2/2017 |
| KR | 2011-0071785 A | 6/2011 |
| KR | 101191832 B1 * | 10/2012 |
| KR | 1513943 B1 | 4/2015 |
| KR | 10-1660451 B1 | 9/2016 |

* cited by examiner

*Primary Examiner* — Angelica Ruiz
(74) *Attorney, Agent, or Firm* — Kaplan Breyer Schwarz, LLP

(57) ABSTRACT

A method and a system for converting and replicating data stored in a source database into target database without a load of the source database due to a replication operation. The system includes a first operating server for the source database, a second operating server for the target database, and a replication server extracting a structured query language (SQL) transmitted from a client to the source database in a network stream transmitted from a client to the first operating server and transmit the converted data structure to the second operating server, thereby synchronizing the source database with a replication database.

1 Claim, 5 Drawing Sheets

METHOD AND SYSTEM FOR REPLICATING DATA TO HETEROGENEOUS DATABASE AND DETECTING SYNCHRONIZATION ERROR OF HETEROGENEOUS DATABASE THROUGH SQL PACKET ANALYSIS

CROSS-REFERENCE TO RELATED APPLICATION

This application claims priority to and the benefit of Korean Patent Application No. 2017-0178652, filed on Dec. 22, 2017, the disclosure of which is incorporated herein by reference in its entirety.

BACKGROUND

1. Field of the Invention

The present invention relates to a method and a system for replicating data, which is contained in a structured query language (SQL) and a bind value which are transmitted to a source database, to a heterogeneous database (such as NoSQL or the like) by extracting and converting the SQL and the bind value from a network stream, and for detecting a synchronization error of the heterogeneous database.

2. Discussion of Related Art

Recently, as social networking services (SNSs), electronic commerce, Internet banking, and the like have become more active in the information age, the constructing data and the importance of database utilizing the constructed data, which contains important information of each company and personal information, are expanding and separate data dictionaries, statistical data, and service data are configured by utilizing the constructed data. In constructing such a separate database, a load of a source database is increased due to an increase of big data such that it is necessary to construct data of a source database by extracting only separate necessary data.

As described above, in order to construct the data of the source database as separate date, extraction, transformation, and loading (ETL) techniques are most used, but these techniques are methods of re-extracting data, which has been stored in the source database, and placing an additional burden on the source database such that there is a problem of causing performance degradation of the source database.

Korean Patent Registration No. 10-1513943, entitled "Method and System for Operating Management of Real-Time Replicated Database," discloses a method and a system for rapidly restoring an operation database and a replication database when software including a data base operation is applied and a failure occurs due to the application of software.

Further, Korean Patent Laid-Open Application No. 10-2011-0071785, entitled "Apparatus and Method for Replicating Data in Distributed Database System," includes a selection unit for selecting a replication partition server for replication of data managed by a source partition server, and a partition assignment unit for assigning replication partitions included in the source partition server to the replication partition server, and a log file management unit for transmitting log file location information of the partitions included in the source partition server to the replication partition server.

Furthermore, Korean Patent Registration No. 10-1660451, entitled "Apparatus and Method for replicating a compressed table of Database," discloses that a real-time replication can be performed even when all valid data values are not included in a log. To this end, a dictionary table, a compressed table, and a real-time replication unit are included, and a replication memory is further included in the real-time replication unit such that a replication can be performed in real time.

However, such conventional replication methods are difficult to be applied when replicating a structured query language (SQL) database is replicated to a heterogeneous database such as a NoSQL database, and these methods are difficult to detect a synchronization error during replication. Further, conventionally, there is a problem of replication delay in which a time is delayed until an update of a source database is applied to an update of a target database.

SUMMARY OF THE INVENTION

The present invention is directed to a method and a system for replicating data to a heterogeneous database through a structured query language (SQL) packet analysis, which are capable of easily performing a replication to heterogeneous data base management system (DBMS) in substantially real time while minimizing a load of a source database on the basis of a extraction result of an SQL packet which is transmitted from a client terminal to a source database and is extracted from a network stream using a sniffing method or a proxy method.

The present invention is also directed to a method and a system for detecting a synchronization error of a heterogeneous DBMS through an SQL packet analysis, which are capable of verifying data synchronization with a replication target database by extracting and analyzing input/output packets of a source database from a network stream when performing a replication to a heterogeneous DBMS.

According to an aspect of the present invention, there is provided a system for replicating data to a heterogeneous database and detecting a synchronization error through a structured query language (SQL) packet analysis, the system including a first operating server configured to operate a source database, a second operating server configured to operate a heterogeneous database of separate processed replicated data, and a replication server configured to extract an SQL transmitted from a client to the source database in a network stream transmitted from a client to the first operating server, convert a data structure, and transmit the converted data structure to the second operating server.

The replication server may include a sniffing module configured to capture packets transmitted from the client to the first operating server or the source database, a proxy module configured to collect packets while serving to relay data between the client and the first operating server, an SQL extraction module configured to analyze the packets captured by the sniffing module and the proxy module and extract SQLs and bind values, a data standardization module configured to convert the extracted SQLs and the bind values into a column-value structure to correspond a schema of a source table, a data structure conversion module configured to perform a change operation of a data structure corresponding to the second operating server which is a target replication system, and a converted data application module configured to transmit the converted data to the second operating server, thereby synchronizing the source database with a target heterogeneous database.

The replication server may include a function of detecting a synchronization error between the source database and a replication database by extracting the SQLs, which are transmitted to the source database, and an execution result of the extracted SQLs in the network stream transmitted from the client to the first operating server and comparing the extracted execution result with a result obtained by transmitting the SQLs to the second operating server.

According to another aspect of the present invention, there is provided a method for replicating data to a heterogeneous database and detecting a synchronization error through a structured query language (SQL) packet analysis, the method including capturing, by a sniffing module or a proxy module of a replication server, network packets transmitted from a client to a source database, sorting a database change SQL by extracting SQLs from the captured network packets through packet filtering, converting data of the sorted database change SQL and the bind values into a column-value structure on the basis of a table schema and converting the column-value structure into a key-value structure, and when a target replication database is a test database, masking a mask key-value on the basis of a sensitive information column value which is set in a replication system, and when the target replication database is a relational data base management system (RDBMS), converting the mask key-value into a standard SQL, and when the target replication database is an NoSQL document-bases DBMS, converting the key-value structure into a document of a JavaScript Object Notation (JSON) format, and transmitting the data of which a data structure conversion is completed to the second operating server.

The method may further include detecting the synchronization error by sorting a query required for synchronization verification among the extracted SQLs, comparing an execution result, which is extracted after the sorted query is executed in the replication database, with a query execution result of the source database, and when the synchronization error is detected through the comparing of the execution results, generating the data change SQL using the execution results and executing the generated data change SQL in the replication database, thereby synchronizing the source database with the replication database.

The detecting of the synchronization error may include when the extracted queries are queries for restoration, generating a data manipulation language (DML), which will be transmitted to the replication database, using query results, transmitting the generated DML to the replication database to perform restoration, and when the synchronization error is detected and the extracted queries are queries for inspection, performing restoration through a data synchronization module, and the performing of the restoration through the data synchronization module may include directly reading the source database and performing a synchronization operation on the replication database.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

The above and other technical objects, features, and advantages of the present invention will become more apparent from preferred embodiments of the present invention, which are described below, when taken in conjunction with the accompanying drawings. The following embodiments are merely illustrative of the present invention and are not intended to limit the scope of the present invention.

Figure 1:
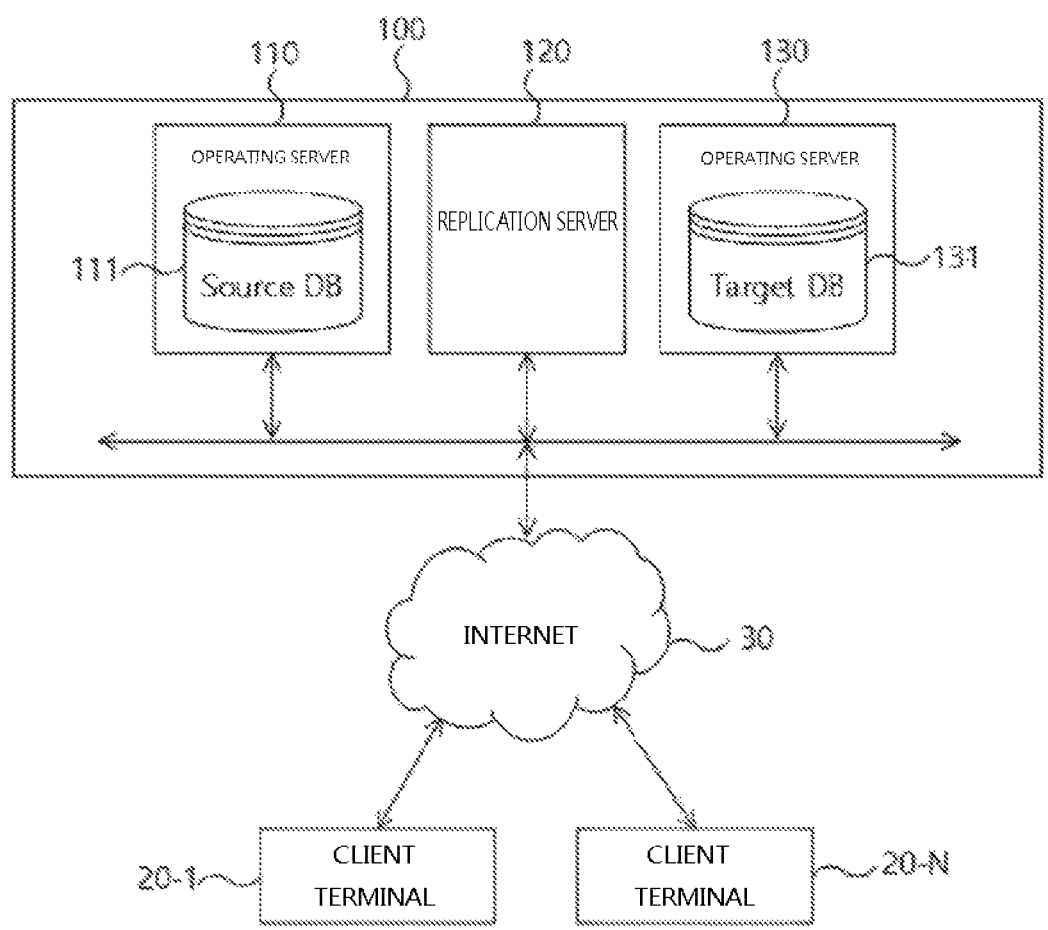
FIG. 1 is a schematic diagram of a system for replicating data to a heterogeneous database and detecting a synchronization error of the heterogeneous database through a structured query language (SQL) packet analysis according to one embodiment of the present invention.

FIG. 1 is a block diagram illustrating an environment in which a database replication system is operated by capturing a packet through a sniffing method or a proxy method using a separate replication server according to the present embodiment.

As shown in FIG. 1, a heterogeneous database replication system 100 includes a first operating server 110 for operating a source database 111, a second operating server 130 for operating a target DB (heterogeneous database) 131 such as NoSQL, and a replication server 120 for extracting a structured query language (SQL) packet, which is transmitted to a source database, from a network stream transmitted from client terminals 20-1 to 20-N to the first operating server 110, performing a standardization operation, and transmitting converted data to the second operating server 130, thereby converting and replicating data constructed in the source database 111.

Referring to FIG. 1, when a user accesses the first operating server 110 or the source database 111 using the client terminals 20-1 to 20-N, the replication server 120 captures data using a sniffing method or a proxy method and converts standardized data according to the heterogeneous database 131 which is operated by the second operating server 130, thereby allowing a replication.

A conventional relational data base management system (RDBMS) is a technique which is mainly used to store structured data in various applications and provides an arbitrary query function through an SQL. With the development of big data and Internet of Things (IoT), a NoSQL database of a new structure for efficiently storing various types of data has emerged. The NoSQL database may be broadly classified into a key-value storage method, a document storage method, and a column storage method, and a key-value storage-based NoSQL database stores data in the form of a key and a value. The document storage-based NoSQL database has a MongoDB and a CouchDB and may extract data through a complicated search condition different from the key-value storage-based NoSQL database. The column storage-based NoSQL database has excellent expandability and includes Cassandra, HBase, and the like.

In this embodiment, the heterogeneous database 131 includes not only a heterogeneous SQL database different from the source database 111 but also a NoSQL database.

Further, the replication server 120 of the present embodiment may replicate source database 111 by converting data into a column-value format using a table schema of the source database 111, which is included in an SQL and a bind value, as meta data, converting replicated or extracted data of the SQL and the bind value into a key-value-based JavaScript Object Notation (JSON) format document, transmitting the key-value-based JSON format document to the second operating server 130, mapping the replicated or extracted NoSQL-based SQL data to the table schema, masking personal information, and transmitting the masked personal information to the second operating server 130.

Furthermore, the replication server 120 of the embodiment may synchronize the second operating server 130 with the source database 111 by converting the extracted SQL according to a phrase provided from a heterogeneous DBMS to replicate data, or by determining a data manipulation language (DML) type of the extracted SQL, and when the extracted SQL is DELETE and UPDATE, providing a function of generating a document delete command and a document update command in a heterogeneous DBMS using a condition of a WHERE phrase, and applying the function to the second operating server 130.

Figure 2:
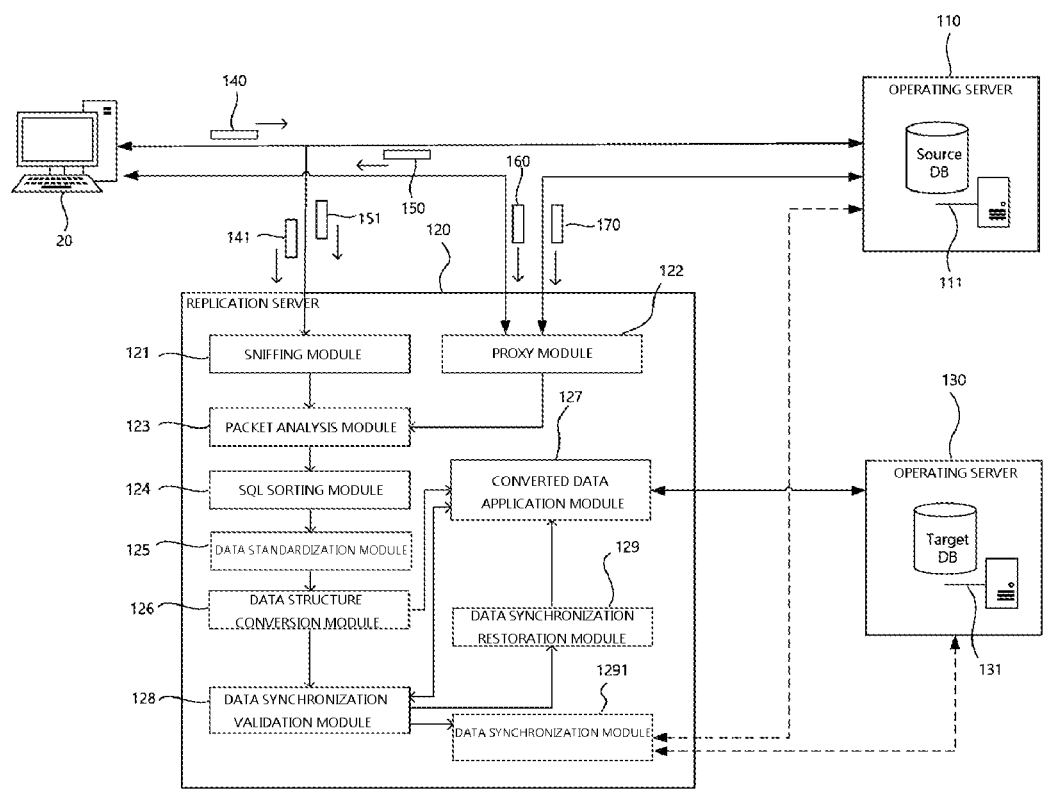
FIG. 2 is a block diagram illustrating a detailed configuration of a replication server according to one embodiment of the present invention.

FIG. 2 is a block diagram illustrating a detailed configuration of a replication server according to the embodiment.

As shown in FIG. 2, the replication server 120 according to the present embodiment includes a sniffing module 121, a proxy module 122, a packet analysis module 123, an SQL sorting module 124, a data standardization module 125, a data structure conversion module 126, a converted data application module 127, a data synchronization validation module 128, a data synchronization restoration module 129, and a data synchronization module 1291, thereby synchronizing the source database 111 with the heterogeneous target database 131.

Referring to FIG. 2, the sniffing module 121 captures a packet 140 transmitted from a client 20 to the first operating server 110 or the source database 111, or a packet 150 toward the client 20. The proxy module 122 collects input/output packets 160 and 170 while serving to relay data transmitted from the client 20 to the first operating server 110.

The packet analysis module 123 analyzes packets 141 and 151 captured by the sniffing module 121 and the packets 160 and 170 captured by the proxy module 122 to extract SQLs and bind values, and the SQL sorting module 124 analyzes the extracted SQLs to sort SQL queries required for synchronization (replication) and synchronization verification.

The data standardization module 125 converts the extracted SQLs and the extracted bind values into a column-value structure to correspond to a schema of an original table, the data structure conversion module 126 performs a conversion operation to convert a data structure corresponding to the target database 131 of the second operating server 130, which is a replication target system, and the converted data application module 127 transmits the converted data to the second operating server 130.

The data synchronization validation module 128 sorts queries required for synchronization verification among the extracted SQLs, transmits the sorted queries to the second operating server 130 which operates the target database 131, executes the sorted queries in the target database 131, and detects a synchronization error by comparing the extracted execution result with the query execution result of the source database 111.

When a synchronization error is detected, the data synchronization module 1291 restores data using the extracted execution result of the source database 111 and the execution result obtained from the target database 131, and the data synchronization module 1291 serves to synchronize the source database 111 with the target database 131 by being directly connected to the source database 111 and the target database 131.

Further, in case the data of the source database 111 and does not match to that of the target database 131 due to an error, the data synchronization validation module 128 of the replication server 120 executes the synchronization verification queries, which are sorted by the SQL sorting module 124, on the target database 131 and compares the execution results to determine whether a synchronization error occurs. Here, the queries required for synchronization verification include a query (an aggregate query for a single table) for only a synchronization error detection and a query (a query for obtaining a predetermined range of row data for a single table) for detection and restoration.

When it is detected that the data of the source database 111 does not match to that of the target database 131, a data change SQL (DML) for data synchronization is configured using the query results of the source database 111 and the target database 131, the data change SQL (DML) is transmitted to the target database 131 through the converted data application module 127, and then whether the data synchronization is normally performed is determined again.

Describing the process of configuring the data change SQL for synchronization restoration, when a Row existing in the query execution result of the source database 111 is not present in the query result of the target database 131, the corresponding Row is configured with "Insert" phrase, and when a Row is not present in the query result of the source database 111 but is present in the query result of the target database 131, the corresponding Row is configured with "Delete" phrase, and when some data is wrong, "Update" phrase is configured and is transmitted to the target database 131 through the converted data application module 127, thereby restoring the synchronization error.

When the sorted queries are only verification queries and a synchronization error is detected through the sorted queries, the source database 111 is directly read using the data synchronization module 1291 and a synchronization operation is performed on the target database 131 such that the target database 131 is restored.

Figure 3:
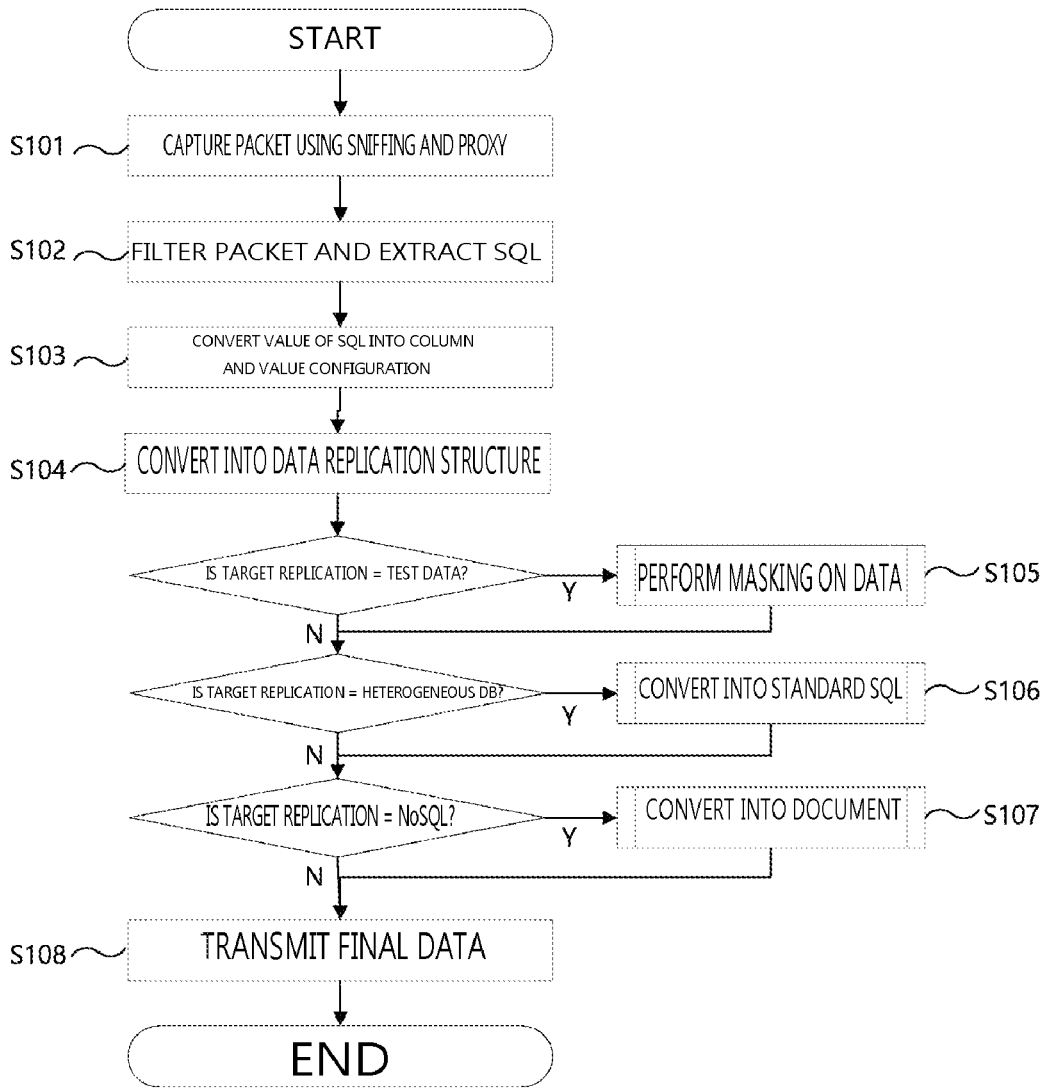
FIG. 3 is a flowchart illustrating a process of capturing and converting a packet to replicate a database in a replication system according to one embodiment of the present invention.

FIG. 3 is a flowchart illustrating a process of capturing and converting a packet to replicate a database in a replication system according to the present embodiment.

Referring to FIG. 3, the sniffing module 121 or the proxy module 122 of the replication server 120 according to the present invention captures a network packet transmitted from the client 20 to the source database 111 (S101).

Subsequently, SQLs and bind values are extracted from the captured network packet through a packet analysis to sort database change SQLs (S102). Data of the database change SQLs and the bind values are converted into a column-value structure on the basis of the table schema (S103), and the column-value structure is converted into a key-value structure to determine a processing logic according to the target database 131 of the second operating server 130 (S104).

For example, when a replication target database is a test database, a masking key value is masked on the basis of a sensitive information column value which is set in the replication system (S105), and when the replication target database is a heterogeneous database, i.e., the target database 131 of the second operating server 130 is an RDBMS, the masking key value is converted into a standard SQL (S106), and when the target database 131 of the second operating server 130 is a NoSQL document storage based DBMS, a key-value structure is converted into a document of a JSON format (S107).

Then, the data of which the data structure conversion is completed is transmitted to the second operating server 130 so as to be applied to the second operating server 130 (S108).

Figure 4:
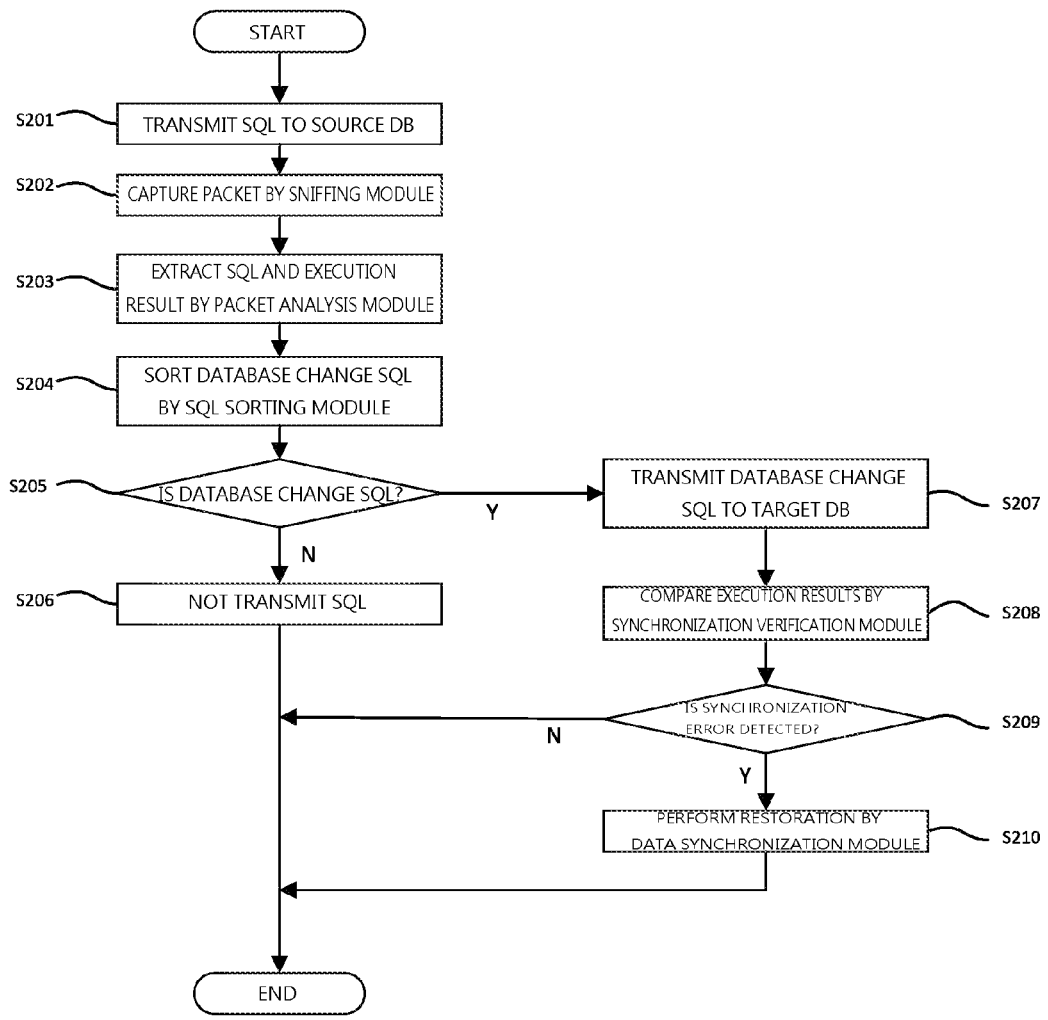
FIG. 4 is a flowchart illustrating a process of collecting and analyzing a packet, selecting a SQL value and a bind value to replicate database, and detecting a synchronization error according to one embodiment of the present invention.
Figure 5:
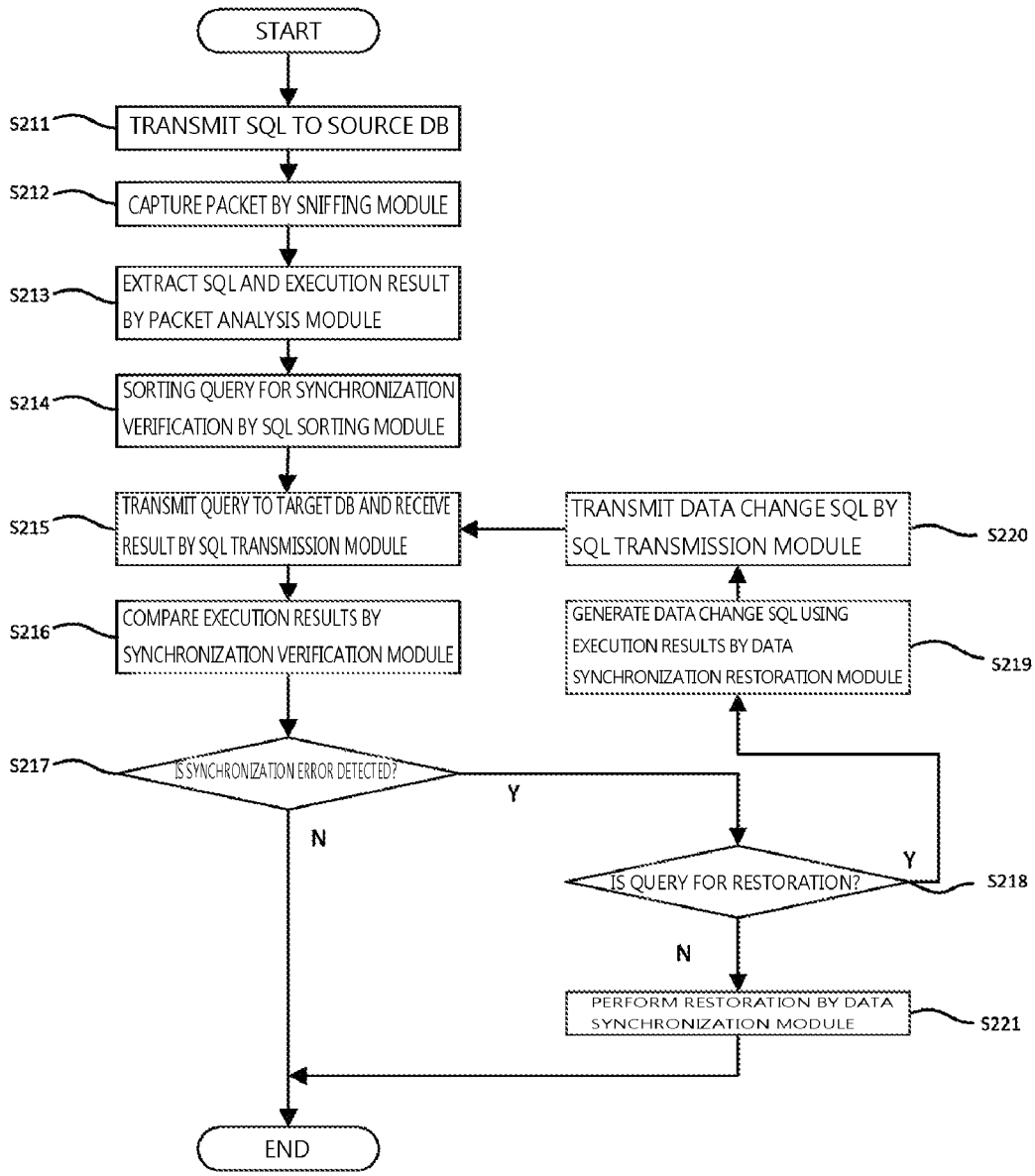
FIG. 5 is a flowchart illustrating a synchronization error checking process of collecting packets, extracting queries required for a synchronization error checking, sorting an execution result of the synchronization error checking, and comparing the execution result with a result of which the extracted queries are executed in a replicated database according to one embodiment of the present invention.

Meanwhile, as shown in FIG. 4 and FIG. 5, a synchronization error search during database replication according to the present embodiment extracts and analyzes input/output packets of the source database 111 in the network stream to verify data synchronization with the replication target database.

First, a synchronization error detection method according to the present embodiment may be performed by two synchronization error detection methods as follows.

The first synchronization error detection method includes acquiring, by the replication server 120, a packet when a packet transmission, by the user, of the source database 111 is determined at a point of time of synchronization with a replication database, analyzing the acquired packet to extract SQLs and an execution result of the extracted SQLs, sorting an SQL changing a database among the extracted SQLs, matching the sorted SQL changing a database to the replication database, and verifying synchronization by comparing an execution result of the replication database (an affected row, an auto increment key, an error) with an execution result of the source database 111 (an affected row and an auto increment key), thereby casually detecting whether a synchronization error occurs.

The second synchronization error detection method includes acquiring, by the replication server 120, a packet after synchronization with the replication database is performed and when a packet transmission, by the user, of the source database 111 is determined, analyzing the acquired packet to extract SQLs and an execution result of the extracted SQLs (Returned row), sorting queries required for synchronization verification among the extracted SQLs, transmitting the sorted queries to the target database 131 to obtain an execution result of the sorted queries, comparing the extracted execution result of source database 111 (Returned row) with the execution result of the target database 131 (Returned row), thereby detecting a synchronization error. At this point, when a synchronization error is detected, a data change SQL is generated using the extracted execution result of the source database 111 (Returned row) and the execution result of the replication database 131 (Returned row), and the generated data change SQL is executed by being transmitted to the replication database 131 such that the synchronization error is restored.

FIG. 4 is a flowchart illustrating a process of collecting and analyzing a packet, sorting SQLs to replicate database, and detecting whether a synchronization error occurs according to the present embodiment, and FIG. 5 is a flowchart illustrating a synchronization error inspection process of collecting packets, extracting queries required for a synchronization error determination and an execution result of the extracted queries (Returned row), and comparing the extracted execution result (Returned row) with a result of which the extracted queries are executed in a replication database (Returned row) according to the present embodiment.

As shown in FIG. 4, the replication server 120 according to the present embodiment includes transmitting SQLs, by the client 20, to the source database 111 (S201), capturing a packet by the sniffing module 121 or the proxy module 122 (S202), extracting the SQLs and an execution result of the SQLs by the packet analysis module 123 (S203), sorting a database change SQL by the SQL sorting module 124 (S204), determining whether an SQL is the database change SQL to not transmit the SQL not causing a database change to the replication database (S206), transmitting the database change SQL to the replication database (S205 and S207), comparing an execution result of the replication database with an execution result of the source database 111 (S208), and when a synchronization error is detected as a result of the comparison result, restoring data through the data synchronization restoration module 129 (S209 and S210).

As shown in FIG. 5, the data synchronization error inspection process includes transmitting, by the client 20, SQLs to the source database 111 (S211), capturing a packet in the sniffing module 121 or the proxy module 122 (S212), extracting, the packet analysis module 123, the SQLs and an execution result of the SQLs (S213), sorting, by the SQL sorting module 124, queries for synchronization error inspection among the extracted SQLs (S214), executing the sorted queries in the target database 131 to obtain an execution result of the sorted queries (S215), comparing the query result of the source database 111 with the query result of the target database 131 to inspect a synchronization error (S216), when the synchronization error is detected and the sorted queries are queries for restoration, generating a DML, which will be transmitted to the target database 131, using the query results (S217 to S219), transmitting generated DML to the target database 131 to perform restoration (S220), and when the synchronization error is detected and the sorted queries are queries for inspection, performing restoration through the data synchronization module 1291.

The database replication system and method according to the embodiments of the present invention can acquire a packet transmitted from a user to a source database without affecting performance of a database operating system using a sniffing method or a proxy method and can construct data in a heterogeneous DBMS using the acquired packet such that there is an effect in that a load cost occurring in the source database can be reduced and a replication delay can be significantly reduced by performing replication in substantially real time.

Further, according to the embodiments of the present invention, it is possible to perform replication not only to an SQL database different from a source SQL database but also to a NoSQL database of a key-value, document, or column storage method such that there is an advantage in that expandability can be increased and data for a test purpose can be separately constructed by masking personal information and sensitive information of extracted data.

Furthermore, the method of detecting and restoring a synchronization error of a database replication system according to the embodiments of the present invention can detect a synchronization error more accurately by discriminating a point of time when a synchronization is performed to a replication database from a case after the synchronization is performed to the replication database, and when sorted queries are only queries for verification, there is an effect in that restoration can be rapidly performed by directly reading the source database using a data synchronization module and performing a synchronization operation on the replication database.

Although the embodiments of the present invention have been described, those skilled in the art will appreciate that various modifications and equivalent other embodiments can be derived without departing from the scope of the present invention. Therefore, the scope of the prevent invention is not limited to these embodiments, and various modifications and improvements devised by those skilled in the art using the fundamental concept of the present invention, which is defined by the appended claims, further fall within the scope of the present invention.

What is claimed is:

1. A method for replicating data to a heterogeneous database and detecting a synchronization error through a structured query language (SQL) packet analysis, the method comprising:

capturing, by a replication server having a sniffing module and a proxy module, network packets transmitted between a client and a source database, the network packets captured by the sniffing module or the proxy module of the replication server;

sorting a database change SQL by extracting SQLs from the captured network packets through packet filtering;

converting the sorted database change SQL into a column-value structure on the basis of a table schema and converting the column-value structure into a key-value structure;

converting the key-value structure into a document of a JavaScript Object Notation (JSON) format;

transmitting the data of which a data structure conversion is completed to an operating server such that the heterogeneous database is synchronized with the source database;

detecting a synchronization error by sorting a query required for synchronization verification among the extracted SQLs and comparing an execution result, which is extracted after the sorted query is executed in the heterogeneous database, with a query execution result of the source database;

generating a data manipulation language (DML), which will be transmitted to the replication database, using query results if the synchronization error is detected and the query required for synchronization verification is for restoration, and transmitting the generated DML to the heterogeneous database to perform restoration; and performing a synchronization operation on the heterogeneous database by directly reading the source database if the synchronization error is detected and the query required for synchronization verification is for inspection, whereby the restoration of the data is performed.

* * * * *